US012674240B2

(12) United States Patent (10) Patent No.: US 12,674,240 B2
Okuno et al. (45) Date of Patent: Jul. 7, 2026

(54) SURFACE-COATED METAL POROUS BODY

(71) Applicants: SUMITOMO ELECTRIC INDUSTRIES, LTD., Osaka (JP); SUMITOMO ELECTRIC TOYAMA CO., LTD., Imizu (JP)

(72) Inventors: Kazuki Okuno, Osaka (JP); Masatoshi Majima, Osaka (JP); Hitoshi Tsuchida, Imizu (JP)

(73) Assignees: SUMITOMO ELECTRIC INDUSTRIES, LTD., Osaka (JP); SUMITOMO ELECTRIC TOYAMA CO., LTD., Toyama (JP)

( * ) Notice: Subject to any disclaimer, the term of this patent is extended or adjusted under 35 U.S.C. 154(b) by 715 days.

(21) Appl. No.: 17/766,606

(22) PCT Filed: Jun. 25, 2020

(86) PCT No.: PCT/JP2020/025024
§ 371 (c)(1),
(2) Date: Jan. 23, 2024

(87) PCT Pub. No.: WO2021/070429
PCT Pub. Date: Apr. 15, 2021

(65) Prior Publication Data
US 2024/0150910 A1 May 9, 2024

(30) Foreign Application Priority Data
Oct. 7, 2019 (JP) ................................. 2019-184547

(51) Int. Cl.
*C25B 11/031* (2021.01)
*C25B 11/04* (2021.01)
(Continued)

(52) U.S. Cl.
CPC ............ *C25B 11/031* (2021.01); *C25B 11/04* (2013.01); *H01M 4/8605* (2013.01); *H01M 4/8657* (2013.01); *H01M 2008/1095* (2013.01)

(58) Field of Classification Search
None
See application file for complete search history.

(56) References Cited

U.S. PATENT DOCUMENTS

2014/0087206 A1    3/2014  Okuno et al.
2014/0227588 A1*   8/2014  Kim ...................... H01M 4/625
                                               429/188
(Continued)

FOREIGN PATENT DOCUMENTS

CN        108365163 A       8/2018
JP        2011-149049 A     8/2011
(Continued)

OTHER PUBLICATIONS

Zhou et al., "Fundermentals of Electro-Optical Countermeasure Materials," Beijing Institute of Technology Press, Jan. 31, 2017, pp. 89-90.
(Continued)

*Primary Examiner* — Xiaobei Wang
(74) *Attorney, Agent, or Firm* — Oliff PLC

(57) ABSTRACT

A surface-coated metal porous body having a three-dimensional network structure, the surface-coated metal porous body including: a framework forming the three-dimensional network structure; and a coating film provided on a surface of the framework, wherein the framework has a body including a metal element as a constituent element, the coating film includes a scale-like carbon material and a fine-grained conductive material, a distance D between two points that are farthest from each other on an outer perimeter of a main surface of the scale-like carbon material is 5% or more and 120% or less relative to a thickness of the
(Continued)

framework, and the scale-like carbon material is deposited on the surface of the framework.

8 Claims, 6 Drawing Sheets

(51) Int. Cl.
     *H01M 4/86*        (2006.01)
     *H01M 8/10*        (2016.01)

(56)                    References Cited

U.S. PATENT DOCUMENTS

2017/0117557  A1       4/2017   Okuno et al.
2018/0013146  A1*      1/2018   Yamada ................ H01M 4/587
2020/0350600  A1*     11/2020   Numata ................. C22C 19/03

FOREIGN PATENT DOCUMENTS

JP          2013-216563  A       10/2013
JP          2015-195115  A       11/2015
JP          2017-027654  A        2/2017
JP          2019-117716  A        7/2019

OTHER PUBLICATIONS

Jun. 19, 2023 Office Action issued in Chinese Patent Application No. 202080069776.2.

* cited by examiner

SURFACE-COATED METAL POROUS BODY

TECHNICAL FIELD

The present disclosure relates to a surface-coated metal porous body. The present application claims priority to Japanese Patent Application No. 2019-184547 filed on Oct. 7, 2019, the entire contents of which are incorporated herein by reference.

BACKGROUND ART

Conventionally, porous bodies such as metal porous bodies have a high porosity and hence a large surface area, and thus have been used in various applications such as battery electrodes, catalyst carriers, metal composite materials, and filters.

CITATION LIST

Patent Literature

PTL 1: Japanese Patent Laying-Open No. 2011-149049

SUMMARY OF INVENTION

A surface-coated metal porous body according to one aspect of the present disclosure is a surface-coated metal porous body having a three-dimensional network structure, the surface-coated metal porous body including:

a framework forming the three-dimensional network structure; and a coating film provided on a surface of the framework, wherein the framework has a body including a metal element as a constituent element, the coating film includes a scale-like carbon material and a fine-grained conductive material, a distance D between two points that are farthest from each other on an outer perimeter of a main surface of the scale-like carbon material is 5% or more and 120% or less relative to a thickness of the framework, and the scale-like carbon material is deposited on the surface of the framework.

DETAILED DESCRIPTION

Figure 1:
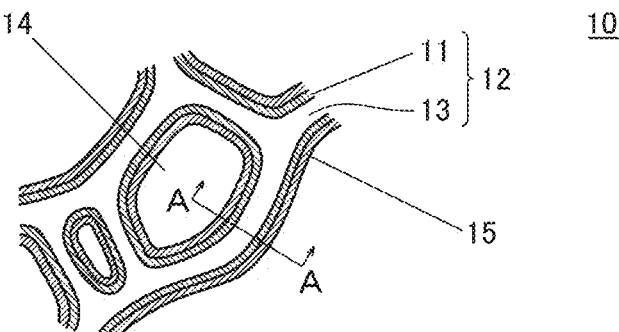
FIG. 1 is a partial cross sectional view schematically showing a partial cross section of a surface-coated metal porous body according to one aspect of the present disclosure.

Problem to be Solved by the Present Disclosure

Japanese Patent Laying-Open No. 2011-149049 (PTL 1) discloses a sheet-like metal porous body prepared by performing conductivity imparting treatment and then metal plating on a resin porous body as a framework, and then performing heat treatment including at least a first step of applying heat under an oxidizing atmosphere to remove the resin porous body and a subsequent second step of applying heat under a reducing atmosphere.

However, since the metal porous body described in PTL 1 is constituted by a metal such as nickel, when the metal porous body is used as a current collector for a battery electrode, in particular as a current collector for electrodes of a polymer electrolyte fuel cell (PEFC) (for example, a current collector for an air electrode, a current collector for a hydrogen electrode), there is room for further improvement, such as improvement in corrosion resistance.

The present disclosure has been made in view of the above circumstances, and an object thereof is to provide a surface-coated metal porous body which is excellent in corrosion resistance.

Advantageous Effect of the Present Disclosure

According to the above, a surface-coated metal porous body which is excellent in corrosion resistance can be provided.

Description of Embodiments of the Present Disclosure

First, embodiments of the present disclosure will be listed and described.

[1] A surface-coated metal porous body according to one aspect of the present disclosure is a surface-coated metal porous body having a three-dimensional network structure, the surface-coated metal porous body including:

a framework forming the three-dimensional network structure; and a coating film provided on a surface of the framework, wherein the framework has a body including a metal element as a constituent element, the coating film includes a scale-like carbon material and a fine-grained conductive material, a distance D between two points that are farthest from each other on an outer perimeter of a main surface of the scale-like carbon material is 5% or more and 120% or less relative to a thickness of the framework, and the scale-like carbon material is deposited on the surface of the framework.

Since the scale-like carbon material is deposited on the surface of the framework in the surface-coated metal porous body, the scale-like carbon material suppresses a corrosive substance (for example, acid or the like) from contacting the framework. As a result, the surface-coated metal porous body is excellent in corrosion resistance.

[2] Preferably, the coating film has a thickness of 0.2 μm or more and 100% or less of a thickness of the body of the framework. The surface-coated metal porous body having such a feature can have a further excellent corrosion resistance.

[3] Preferably, the scale-like carbon material includes graphite. The surface-coated metal porous body having such a feature can have a further excellent corrosion resistance.

[4] Preferably, the scale-like carbon material has an aspect ratio of 5 or more and 100 or less. The surface-coated metal porous body having such a feature can have a further excellent corrosion resistance.

[5] Preferably, the fine-grained conductive material includes at least one selected from the group consisting of carbon black, titanium, spheroidal graphite, and stainless steel. The surface-coated metal porous body having such a feature can have an excellent conductivity in addition to an excellent corrosion resistance.

[6] Preferably, the metal element in the body of the framework includes at least one selected from the group consisting of nickel, aluminum, copper, chromium, and tin. The surface-coated metal porous body having such a feature can have an excellent mechanical strength.

[7] Preferably, when the body of the framework is observed in cross section at a magnification of 3,000 times to obtain an observed image, the observed image presents in any area 10 μm square thereof five or less voids each having a longer diameter of 1 μm or more. This allows sufficiently increased strength.

[8] Preferably, the framework is hollow. This allows the surface-coated metal porous body to be lightweight and can also reduce an amount of metal required.

Detailed Description of Embodiments of the Present Disclosure

Hereinafter, an embodiment of the present disclosure (hereinafter also referred to as "the present embodiment") will be described. It should be noted, however, that the present embodiment is not exclusive. In the present specification, an expression in the form of "A to B" means lower and upper limits of a range (that is, A or more and B or less), and when A is not accompanied by any unit and B is alone accompanied by a unit, A has the same unit as B.

<<Surface-Coated Metal Porous Body>>

A surface-coated metal porous body according to the present embodiment is a surface-coated metal porous body having a three-dimensional network structure, the surface-coated metal porous body including:

a framework forming the three-dimensional network structure; and a coating film provided on a surface of the framework, wherein the framework has a body including a metal element as a constituent element, the coating film includes a scale-like carbon material and a fine-grained conductive material, a distance D between two points that are farthest from each other on an outer perimeter of a main surface of the scale-like carbon material is 5% or more and 120% or less relative to a thickness of the framework, and the scale-like carbon material is deposited on the surface of the framework.

The surface-coated metal porous body having such a feature is excellent in corrosion resistance. Herein, the "corrosion resistance" in the present embodiment means resistance to corrosion by acid and resistance to corrosion by $O_2$ gas (generation of rust). Since the surface-coated metal porous body is excellent in corrosion resistance, it can be suitably used as a current collector for electrodes of a PEFC, an electrode for alkaline water electrolysis, and an electrode for PEM type water electrolysis.

The surface-coated metal porous body can have an external appearance shaped in a variety of forms, such as a sheet, a rectangular parallelepiped, a sphere, and a cylinder. Inter alia, the surface-coated metal porous body preferably has a sheet-shaped external appearance and has a thickness of 0.2 mm or more and 100 mm or less. The surface-coated metal porous body more preferably has a thickness of 0.5 mm or more and 2 mm or less. The surface-coated metal porous body having a thickness of 100 mm or less (in particular, 2 mm or less) can reduce the amount of metal required. The surface-coated metal porous body having a thickness of 0.2 mm or more can have a necessary strength. The thickness can be measured for example with a commercially available digital thickness gauge.

<Framework>

The surface-coated metal porous body includes a framework forming the three-dimensional network structure. The framework has a body including a metal element as a constituent element.

As shown in FIG. 1, a framework 12 has a three-dimensional network structure having a pore 14. Further, as shown in FIG. 1, a coating film 15 is provided on a surface of framework 12. The three-dimensional network structure and the coating film will more specifically be described hereinafter. Framework 12 is composed of a body 11 including the metal element as a constituent element (hereinafter also referred to as a "framework body 11") and a hollow inner portion 13 surrounded by framework body 11. Framework body 11 forms a rib and a node, as will be described hereinafter. Thus, the framework is preferably hollow.

Figure 2:
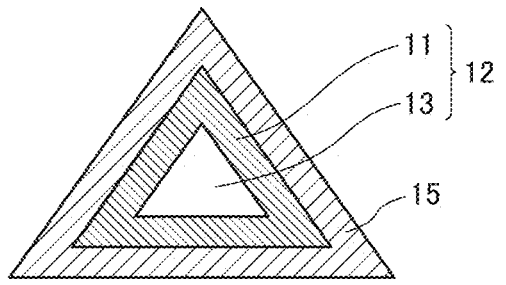
FIG. 2 is a cross sectional view taken along a line A-A in FIG. 1.

Furthermore, as shown in FIG. 2, the shape of a cross section orthogonal to a longitudinal direction of the rib of framework 12 is preferably a triangle. However, the shape of the cross section of the rib of framework 12 should not be limited thereto. The shape of the cross section of the rib of framework 12 may be a polygon other than a triangle, such as a quadrangle or a hexagon. In the present embodiment, the "triangle" is a concept including the shape of not only a geometric triangle but also an approximate triangle. The same applies to other polygons.

That is, preferably, framework 12 is such that inner portion 13 surrounded by framework body 11 has a hollow tubular shape, and the cross section orthogonal to the longitudinal direction of the rib is a triangle or a polygon other than that. Since the rib in framework 12 has a tubular shape, framework body 11 has an inner wall which forms an inner surface of the tube and an outer wall which forms an outer surface of the tube. Framework 12 having framework body 11 surrounding inner portion 13 that is hollow allows the surface-coated metal porous body to be significantly lightweight. However, the framework is not limited to being hollow and may instead be solid. In this case, the surface-coated metal porous body can be enhanced in strength.

The framework preferably includes a metal constituting the same such that the metal has an apparent weight of 200 $g/m^2$ or more and 4,000 $g/m^2$ or less. The apparent weight is more preferably 250 g/m² or more and 900 g/m² or less. As will be described hereinafter, the apparent weight can be appropriately adjusted for example when plating is applied on a conductive resin molded body having undergone conductivity imparting treatment.

The apparent weight described above is converted into a mass per unit volume of the framework (or an apparent density of the framework), as follows. That is, the framework has an apparent density of preferably 0.14 g/cm³ or more and 0.75 g/cm³ or less, and more preferably 0.18 g/cm³ or more and 0.65 g/cm³ or less. Herein, the "framework's apparent density" is defined by the following expression:

$$\text{Framework's apparent density (g/cm}^3) = M \text{ (g)}/V \text{ (cm}^3),$$

where M: mass of framework [g], and
    V: volume of shape of external appearance of framework [cm³].

The framework has a porosity of preferably 40% or more and 98% or less, more preferably 45% or more and 98% or less, and most preferably 50% or more and 98% or less. The framework having a porosity of 40% or more allows the obtained surface-coated metal porous body to be significantly lightweight and also have an increased surface area. The framework having a porosity of 98% or less allows the surface-coated metal porous body to have a sufficient strength.

The framework's porosity is defined by the following expression:

$$\text{Porosity (\%)} = [1 - \{M/(V \times d)\}] \times 100,$$

where M: mass of framework [g],
    V: volume of shape of external appearance of framework [cm³], and
    d: density of metal constituting framework [g/cm³].

The framework preferably has an average pore diameter of 60 μm or more and 3,500 μm or less. The framework having an average pore diameter of 60 μm or more can enhance the surface-coated metal porous body in strength. The framework having an average pore diameter of 3,500 μm or less can enhance the porous body in bendability (or bending workability). From these viewpoints, the framework has an average pore diameter of more preferably 60 μm or more and 1,000 μm or less, and most preferably 100 μm or more and 850 μm or less.

The framework's average pore diameter can be determined by the following method. That is, first, a microscope is used to observe the surface of the framework at a magnification of 3,000 times to obtain an observed image, and at least 10 fields of view thereof are prepared. Subsequently, in each of the prepared 10 fields of view, the number of pores is determined per 1 inch (25.4 mm=25,400 μm) of a cell, which will be described hereinafter. Furthermore, the numbers of pores in these 10 fields of view are averaged to obtain an average value ($n_c$) which is in turn substituted into the following expression to calculate a numerical value, which is defined as the framework's average pore diameter:

$$\text{Average pore diameter (μm)} = 25{,}400 \text{ μm}/n_c.$$

Note that herein the framework's porosity and average pore diameter are regarded as the same as the surface-coated metal porous body's porosity and average pore diameter. In a precise sense, the surface-coated metal porous body's porosity and average pore diameter are considered to be smaller than the framework's porosity and average pore diameter, respectively, by the volume of the coating film provided on the surface of the framework. However, the present inventors consider that a change therebetween is not large and both can be regarded as substantially the same.

Preferably, when the body of the framework is observed in cross section at a magnification of 3,000 times to obtain an observed image, the observed image presents in any area 10 μm square thereof five or less voids each having a longer diameter of 1 μm or more. The number of voids is more preferably three or less. The surface-coated metal porous body can thus sufficiently be enhanced in strength. Furthermore, it is understood that, as the number of voids is five or less, the body of the framework is different from a molded body obtained by sintering fine grains. The lower limit of the number of voids observed is, for example, zero. Herein, the "number of voids" means an average in number of voids determined by observing each of a plurality of (for example, 10) "areas 10 μm square" in the cross section of the framework body.

The framework can be observed in cross section by using an electron microscope. Specifically, it is preferable to obtain the "number of voids" by observing the cross section of the framework body in 10 fields of view. The cross section of the framework body may be a cross section orthogonal to the longitudinal direction of the rib of the framework, or may be a cross section parallel to the longitudinal direction of the rib of the framework. In the observed image, a void can be distinguished from other parts by contrast in color (or difference in brightness). While the upper limit of the longer diameter of the void should not be limited, it is for example 10,000 μm. When the longer diameter of the void is unknown because the entire void is not included within one field of view, the magnification may be changed to determine the longer diameter of the void.

The framework body preferably has a thickness of 10 μm or more and 500 μm or less. Herein, "the framework body's thickness" means a shortest distance from an inner wall, or an interface with the hollow of the inner portion, of the framework to an outer wall located on an external side of the framework, and an average value thereof is defined as "the framework body's thickness". The framework body's thickness can be determined by observing the cross section of the rib of the framework with an electron microscope.

Specifically, the framework body's thickness can be determined by the following method. First, a sheet-shaped surface-coated metal porous body is cut to expose a cross section of the rib of the framework. One cross section cut is selected and enlarged with an electron microscope at a magnification of 3,000 times and thus observed to obtain an observed image. Subsequently, a thickness of any one side of a polygon (for example, the triangle shown in FIG. 2) forming the rib of one framework appearing in the observed image is measured at a center of that side, and defined as the framework body's thickness. Further, such measurement is done for 10 observed images (or in 10 fields of view) to obtain the framework body's thickness at 10 points. Finally, the 10 points' average value is calculated to obtain the "framework body's thickness".

The framework has a thickness of preferably 50 μm or more and 2,000 μm or less. Herein, when the cross section orthogonal to the longitudinal direction of the rib of the framework is a triangle, the "thickness" of the framework means a length of one side of a regular triangle having an area equal to an area surrounded by an outer edge of the cross section.

(Three-Dimensional Network Structure)

The framework forms a three-dimensional network structure. In the present embodiment, the "three-dimensional network structure" means a structure in the form of a three-dimensional network. Hereinafter, the three-dimensional network structure will more specifically be described.

Figure 3A:
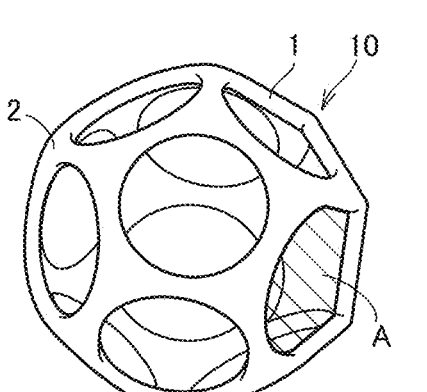
FIG. 3A is an enlarged schematic diagram focusing on one cell in the porous body in order to illustrate a three-dimensional network structure of the surface-coated metal porous body according to one aspect of the present disclosure.
Figure 3B:
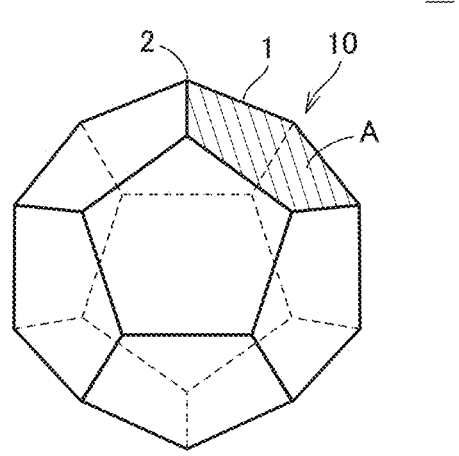
FIG. 3B is a schematic diagram showing an aspect of a shape of the cell.
Figure 7:
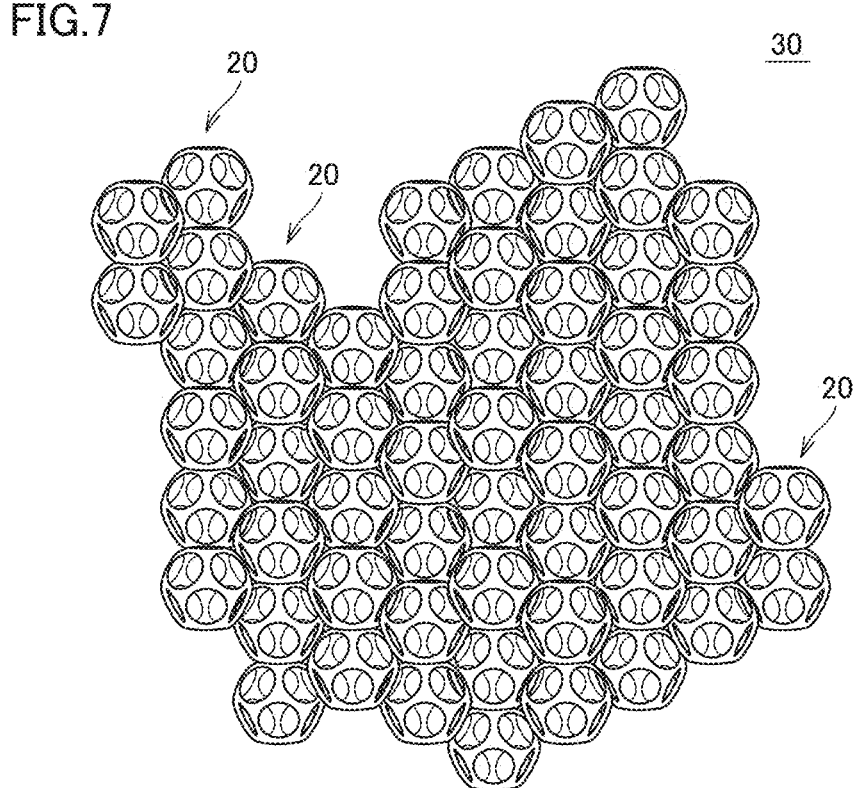
FIG. 7 is a schematic diagram showing one aspect of a three-dimensional network structure formed by a plurality of cells joined together.

As shown in FIG. 7, a three-dimensional network structure 30 has a cell 20 as a basic unit, and is formed of a plurality of cells 20 joined together. As shown in FIGS. 3A and 3B, cell 20 includes a rib 1 and a node 2 that connects a plurality of ribs 1. Although rib 1 and node 2 are described separately in terminology for the sake of convenience, there is no clear boundary therebetween. That is, a plurality of ribs 1 and a plurality of nodes 2 are integrated together to form cell 20, and cell 20 serves as a constituent unit to form three-dimensional network structure 30. Hereinafter, in order to facilitate understanding, the cell shown in FIG. 3A will be described as a regular dodecahedron shown in FIG. 3B.

First, a plurality of ribs 1 and a plurality of nodes 2 are present to form a frame in the form of a planar polygonal structure. While FIG. 3B shows frame 10 having a polygonal structure that is a regular pentagon, frame 10 may be a polygon other than a regular pentagon, such as a triangle, a quadrangle, or a hexagon. Herein, the structure of frame 10 can also be understood such that a plurality of ribs 1 and a plurality of nodes 2 form a planar polygonal aperture. In the present embodiment, the planar polygonal aperture has a diameter, which means a diameter of a circle circumscribing the planar polygonal aperture defined by frame 10. A plurality of frames 10 are combined together to form cell 20 that is a three-dimensional, polyhedral structure. In doing so, one rib 1 and one node 2 are shared by a plurality of frames 10.

As shown in the schematic diagram of FIG. 2 described above, rib 1 preferably has, but is not limited to, a hollow tubular shape and has a triangular cross section orthogonal to its longitudinal direction. The shape of the cross section of rib 1 may be a polygon other than a triangle, such as a quadrangle or a hexagon. Node 2 may be shaped to have a vertex to have a sharp edge, the vertex chamfered to have a planar shape, or the vertex rounded to have a curved shape.

Figure 4A:
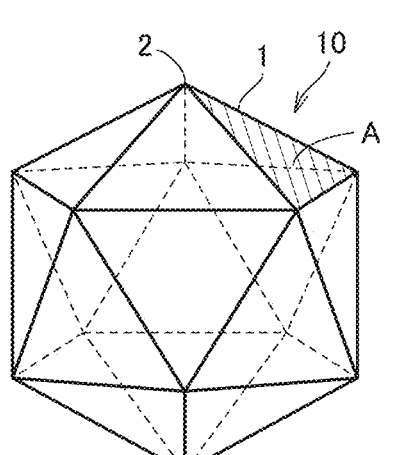
FIG. 4A is a schematic diagram showing another aspect of the shape of the cell.
Figure 4B:
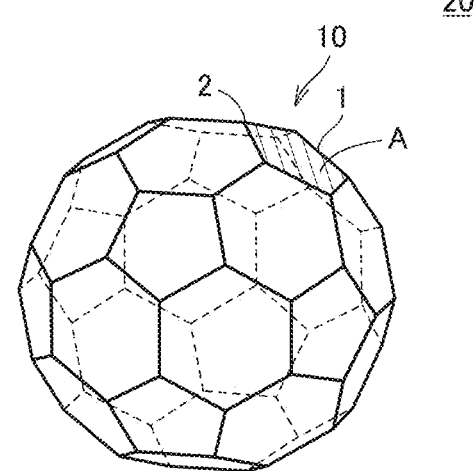
FIG. 4B is a schematic diagram showing still another aspect of the shape of the cell.

While the polyhedral structure of cell 20 is a dodecahedron in FIG. 3B, it may be another polyhedron such as a cube, an icosahedron (see FIG. 4A), or a truncated icosahedron (see FIG. 4B). Herein, the structure of cell 20 can also be understood as forming a three-dimensional space (i.e., pore 14) surrounded by a virtual plane A defined by each of a plurality of frame 10. In the present embodiment, it can be understood that the three-dimensional space has a pore with a diameter (hereinafter also referred to as a "pore diameter") which is a diameter of a sphere circumscribing the three-dimensional space defined by cell 20. Note, however, that in the present embodiment the porous body's pore diameter is calculated based on the above-described calculation expression for the sake of convenience. That is, the diameter of the pore (or the pore diameter) of the three-dimensional space defined by cell 20 refers to what is the same as the framework's average pore diameter.

Figure 5:
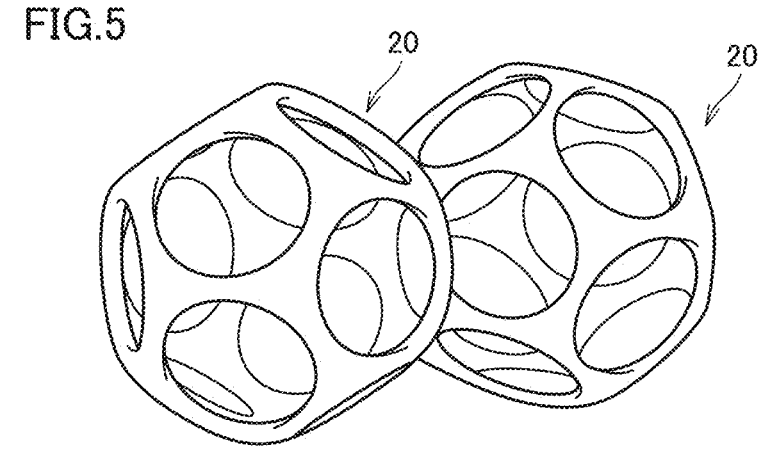
FIG. 5 is a schematic diagram showing an aspect of two cells joined together.
Figure 6:
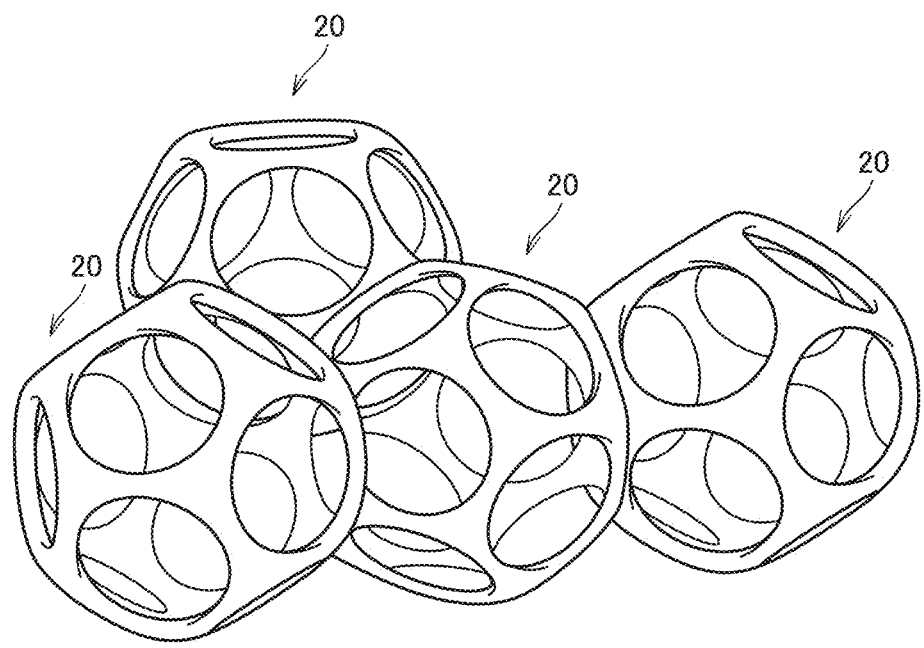
FIG. 6 is a schematic diagram showing an aspect of four cells joined together.

A plurality of cells 20 are combined together to form three-dimensional network structure 30 (see FIGS. 5 to 7). In doing so, frame 10 is shared by two cells 20. Three-dimensional network structure 30 can also be understood to include frame 10 and can also be understood to include cell 20.

As has been described above, the surface-coated metal porous body has a three-dimensional network structure that forms a planar polygonal aperture (or a frame) and a three-dimensional space (or a cell). Therefore, it can be clearly distinguished from a two-dimensional network structure only having a planar aperture (for example, a punched metal, a mesh, etc.). Furthermore, the surface-coated metal porous body has a plurality of ribs and a plurality of nodes integrally forming a three-dimensional network structure, and can thus be clearly distinguished from a structure such as non-woven fabric formed by intertwining fibers serving as constituent units. The surface-coated metal porous body having such a three-dimensional network structure can have continuous pores.

In the present embodiment, the three-dimensional network structure is not limited to the above-described structure. For example, the cell may be formed of a plurality of frames each having a different size and a different planar shape. Furthermore, the three-dimensional network structure may be formed of a plurality of cells each having a different size and a different three-dimensional shape. The three-dimensional network structure may partially include a frame without having a planar polygonal aperture therein or may partially include a cell without having a three-dimensional space therein (or a cell having a solid interior).

(Metal Element)

The body of the framework includes a metal element as a constituent element. While the metal element is not specifically limited, it preferably includes at least one selected from the group consisting of nickel (Ni), aluminum (Al), copper (Cu), chromium (Cr), and tin (Sn), for example. The body of the framework may include the metal element as a single metal or an alloy. Examples of the alloy include a tin-nickel alloy (SnNi alloy), a nickel-chromium alloy (NiCr alloy), a nickel-aluminum alloy (NiAl alloy), and the like. Since the body of the framework includes a single metal or an alloy, the surface-coated metal porous body has conductivity.

(Other Elements)

The body of the framework can include other elements as constituent elements unless the other elements affect the presently disclosed surface-coated metal porous body's function and effect. As the other elements, the body of the framework may include, for example, silicon, magnesium, carbon, sodium, iron, tungsten, titanium, phosphorus, boron, silver, gold, molybdenum, nitrogen, sulfur, fluorine, and chlorine.

These components may be included, for example, as unavoidable impurities that are unavoidably introduced in a manufacturing method described hereinafter. For example, examples of unavoidable impurities include elements included in a conductive coating layer formed by conductivity imparting treatment described hereinafter. The framework body preferably contains such another element individually in a ratio of 5% by mass or less, and such other elements together in a ratio of 10% by mass or less.

(Method for Measuring Content Ratio of Each Element)

The ratio of each element (for example, a metal element) contained in the body of the framework (in % by mass) can be determined as follows. An image of a cross section of the framework cut, as observed through a scanning electron microscope (SEM), can be analyzed for element analysis with an EDX device accompanying the SEM (for example, an SEM part: trade name "SUPRA35VP" manufactured by Carl Zeiss Microscopy Co., Ltd., and an EDX part: trade name "octane super" manufactured by AMETEK, Inc.). The EDX device can also be used to determine the ratio of each element contained in the body of the framework. Specifically, based on the atomic concentration of each element detected by the EDX device, each element in % by mass, mass ratio, and the like in the body of the framework can be determined.

<Coating Film>

Coating film 15 according to the present embodiment is provided on the surface of framework 12 (see FIGS. 1 and 2). The coating film includes a scale-like carbon material and a fine-grained conductive material. In an aspect of the present embodiment, the coating film may further include a binder.

Herein, the coating film in the present embodiment and a carbon coat in a current collector used in a lithium battery have different technical roles. That is, the carbon coat in the lithium battery is used as an active material, whereas the coating film in the present embodiment is used to prevent the body of the framework from contacting a corrosive liquid. Thus, they have different technical roles.

The coating film has a thickness of 0.2 μm or more and 100% or less of the thickness of the body of the framework. In one aspect of the present embodiment, the thickness of the coating film is preferably 0.2 μm or more and 500 μm or less, and more preferably 0.5 μm or more and 100 μm or less. The thickness of the coating film can be determined by observing a cross section of the surface-coated metal porous body with an electron microscope, as described above.

(Scale-Like Carbon Material)

In the present embodiment, the "scale-like carbon material" means a carbon material having the shape of small thin pieces like scales.

Distance D between two points that are farthest from each other on an outer perimeter of a main surface of the scale-like carbon material is 5% or more and 120% or less, preferably 6% or more and 100% or less, and more preferably 8% or more and 50% or less, relative to the thickness of the framework. Thereby, the surface-coated metal porous body can have an excellent corrosion resistance. Herein, the "main surface" means a largest surface in the scale-like carbon material.

Distance D is calculated as follows. First, a cross section of the surface-coated metal porous body is observed with an SEM. The cross section on this occasion is a cross section orthogonal to the longitudinal direction of the rib of the framework in the surface-coated metal porous body. In an observed image obtained with the SEM, a longer diameter of the scale-like carbon material is determined. Such measurement is done for at least 10 pieces of the scale-like carbon material, and an average value of the determined values is defined as distance D of the scale-like carbon material. The ratio of distance D to the thickness of the framework is determined by the following expression:

$$\text{Ratio of distance } D \text{ to thickness of framework } (\%) = \{\text{distance } D \text{ (μm)/thickness of framework (μm)}\} \times 100.$$

In one aspect of the present embodiment, distance D is preferably 2.5 μm or more and 2,400 μm or less, more preferably 2.5 μm or more and 250 μm or less, and further preferably 2.5 μm or more and 50 μm or less.

Figure 8:
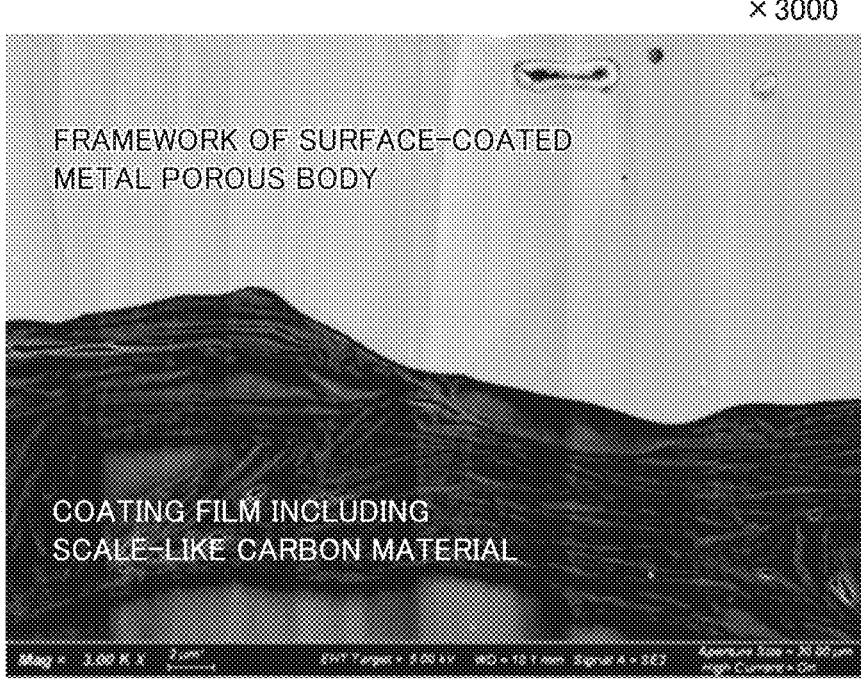
FIG. 8 is an enlarged cross sectional photograph of a surface-coated metal porous body according to one aspect of the present embodiment.

The scale-like carbon material is deposited on the surface of the framework (for example, FIG. 8). Since the scale-like carbon material is deposited in such a manner, even when the surface-coated metal porous body contacts acid or the like, permeation of the acid or the like into the coating film is suppressed, and corrosion of the framework is suppressed.

In one aspect of the present embodiment, the scale-like carbon material is preferably deposited to be parallel to the surface of the framework. In the present embodiment, "parallel" is a concept including the meaning of not only "geometrically parallel" but also "substantially parallel". By depositing the scale-like carbon material to be parallel to the surface of the framework, grain boundary paths of the carbon material in the coating film increase. Accordingly, permeation of the acid or the like into the coating film is further suppressed, and corrosion of the framework is suppressed.

Preferably, the scale-like carbon material includes graphite.

The scale-like carbon material has an aspect ratio of preferably 5 or more and 100 or less, and more preferably 8 or more and 50 or less. Herein, the aspect ratio means the ratio between the longer diameter and a thickness in the scale-like carbon material. The aspect ratio is calculated as follows. First, a cross section of the surface-coated metal porous body is observed with an SEM. The cross section on this occasion is a cross section orthogonal to the longitudinal direction of the rib of the framework in the surface-coated metal porous body. In an observed image obtained with the SEM, the longer diameter and the thickness of the scale-like carbon material are determined. Such measurement is done for at least 10 pieces of the scale-like carbon material, and average values of the respective determined values are defined as the longer diameter and the thickness of the scale-like carbon material. It should be noted that the longer diameter can also be understood as distance D. The aspect ratio is determined by the following expression:

$$\text{Aspect ratio} = \text{longer diameter of scale-like carbon material (μm)/thickness of scale-like carbon material (μm).}$$

(Fine-Grained Conductive Material)

In the present embodiment, the "fine-grained conductive material" means a material which has the shape of fine grains and conducts electricity. In one aspect of the present embodiment, the fine-grained conductive material can also be understood as grains with a grain diameter smaller than the thickness of the coating film.

The fine-grained conductive material has an average grain diameter of preferably 10 nm or more and 500 nm or less, and more preferably 20 nm or more and 100 nm or less. The average grain diameter is calculated as follows.

First, a surface or a cross section of the surface-coated metal porous body is observed with an SEM. The cross section on this occasion may be a cross section orthogonal to the longitudinal direction of the rib of the framework in the surface-coated metal porous body. Grain diameters (Heywood diameters: equal-area equivalent circle diameters) of individual grains of the conductive material are calculated, and an average value thereof is defined as the average grain diameter of the fine-grained conductive material. The number of grains to be measured is at least 10 or more, and further preferably 30 or more. The number of fields of view in which image analysis is performed is preferably five or more, more preferably eight or more, and further preferably 10 or more. One field of view may be 600 μm in length×800 μm in width, for example. A series of operations for calculating the average grain diameter of grains as described above may be performed using image analysis software. As the image analysis software, image analysis type grain size distribution software ("Mac-View" manufactured by MOUNTECH) can be suitably used.

Preferably, the fine-grained conductive material includes at least one selected from the group consisting of carbon black, titanium, spheroidal graphite, and stainless steel. Such a surface-coated metal porous body can have an excellent conductivity in addition to an excellent corrosion resistance.

(Binder)

While the binder is not specifically limited, examples thereof include styrene butadiene rubber (SBR), polyvinyl alcohol (PVA), polyvinylidene fluoride (PVDF), and the like.

<<Method for Manufacturing Surface-coated Metal Porous Body>>

The surface-coated metal porous body according to the present embodiment can be manufactured by appropriately using a conventionally known method. For this reason, while the method for manufacturing the surface-coated metal porous body should not be specifically limited, the following method is preferable.

That is, preferably, the surface-coated metal porous body is manufactured by a method for manufacturing a surface-coated metal porous body, including: forming a conductive coating layer on a resin molded body having a three-dimensional network structure to obtain a conductive resin molded body (a first step); plating the conductive resin molded body to obtain a metal porous body (a second step); and forming a coating film on a surface of a framework in the metal porous body (a third step).

<First Step>

First, a sheet of a resin molded body having a three-dimensional network structure (hereinafter also simply referred to as a "resin molded body") is prepared. Polyurethane resin, melamine resin, or the like can be used as the resin molded body. Furthermore, as conductivity imparting treatment for imparting conductivity to the resin molded body, a conductive coating layer is formed on a surface of the resin molded body. Examples of the conductivity imparting treatment can include the following methods:

(1) applying a conductive paint containing carbon, conductive ceramic or similarly conductive grains, and a binder to the resin molded body, impregnating the resin molded body with the conductive paint, or the like to include the conductive paint in the surface of the resin molded body;

(2) forming a layer of a conductive metal such as nickel or copper on the surface of the resin molded body by electroless plating;

(3) forming a layer of a conductive metal on the surface of the resin molded body by vapor deposition or sputtering. By any one or more of these methods, a conductive resin molded body can be obtained.

<Second Step>

Subsequently, the conductive resin molded body is plated to obtain a metal porous body. The method of plating is not specifically limited, and electroless plating can also be applied. As the method of plating, electrolytic plating (so-called electroplating) is preferably used from the viewpoint of efficiency. In the electrolytic plating, the conductive resin molded body is used as a cathode.

The electrolytic plating can be done using a known plating bath. For example, a watt bath, a chloride bath, a sulfamic acid bath, or the like can be used. For example, electrolytic plating of nickel can be performed with a bath composition under conditions for electrolysis, as follows.

(Bath Composition)

Salt (aqueous solution): Nickel sulfamate (350 to 450 g/L as the amount of Ni)
Boric acid: 30 to 40 g/L
pH: 4 to 4.5.

(Conditions for Electrolysis)

Temperature: 40 to 60° C.
Current density: 0.5 to 10 A/dm$^2$
Anode: Insoluble anode.

A metal porous body having the conductive resin molded body plated with a desired metal can thus be obtained. It should be noted that, after plating, the resin molded body used as a base material may be removed by heat treatment or the like.

Herein, the metal porous body obtained by the above method has an average pore diameter substantially equal to that of the resin molded body. Accordingly, the average pore diameter of the resin molded body used to obtain the metal porous body may be selected as appropriate, depending on the application of the surface-coated metal porous body. As the metal porous body has a porosity ultimately determined by the amount (the apparent weight) of the plating metal, the apparent weight of the plating metal may be selected as appropriate, depending on the porosity required for the metal porous body. The resin molded body's porosity and average pore diameter are defined in the same manner as the above described framework's porosity and average pore diameter, and can be determined based on the above calculation expressions with the term "framework" replaced with the term "resin molded body."

<Third Step>

Subsequently, a coating film is formed on a surface of a framework in the metal porous body to obtain a surface-coated metal porous body. Specifically, for example, the third step is performed through the following procedure. First, a mixed solution containing a scale-like carbon material, a fine-grained conductive material, a binder, and a solvent is prepared. Then, the mixed solution is brought into contact with the surface of the framework of the metal porous body. Thereafter, the mixed solution existing on the surface of the framework is dried to form the coating film.

The content ratio of the scale-like carbon material to the total mass of the mixed solution is preferably 10% by mass or more and 70% by mass or less, more preferably 35% by mass or more and 70% by mass or less, and further preferably 40% by mass or more and 65% by mass or less.

The content ratio of the fine-grained conductive material to the total mass of the mixed solution is preferably 3% by mass or more and 20% by mass or less, and more preferably 5% by mass or more and 15% by mass or less.

The content ratio of the binder to the total mass of the mixed solution is preferably 5% by mass or more and 50% by mass or less, more preferably 10% by mass or more and 50% by mass or less, and further preferably 20% by mass or more and 40% by mass or less.

While the solvent contained in the mixed solution is not specifically limited, examples thereof include xylene, N-methyl pyrrolidone (NMP), pure water, and the like.

The content ratio of the solvent to the total mass of the mixed solution is preferably 50% by mass or more and 95% by mass or less, more preferably 65% by mass or more and 90% by mass or less, and further preferably 65% by mass or more and 82% by mass or less.

While the method of bringing the mixed solution into contact with the surface of the framework of the metal porous body is not specifically limited, examples thereof include the method of immersing the metal porous body in the mixed solution, the method of applying the mixed solution on the surface of the framework of the metal porous body, and the like.

Before the mixed solution existing on the surface of the framework is dried, the mixed solution excessively existing thereon may be removed by air blow or the like, from the viewpoint of preventing clogging of the metal porous body.

While the method of drying the mixed solution existing on the surface of the framework is not specifically limited, examples thereof include drying the mixed solution at 150° C. for five minutes.

The procedure from bringing the mixed solution into contact with the surface of the framework to drying the mixed solution may be performed once, or may be repeatedly performed a plurality of times (for example, three times). By performing this procedure a plurality of times, a thick coating film can be formed on the surface of the framework.

Herein, the surface-coated metal porous body obtained by the above method has an average pore diameter substantially equal to that of the metal porous body. As the surface-coated metal porous body has a porosity ultimately determined by the amount of the coating film formed, the amount of the coating film may be selected as appropriate, depending on the porosity required for the surface-coated metal porous body as a final product.

Through the above steps, the surface-coated metal porous body according to the present embodiment can be manufactured.

EXAMPLES

Hereinafter, the present invention will more specifically be described with reference to examples, although the present invention is not limited thereto.

result, 660 g/m$^2$ of metallic nickel was deposited on the conductive resin molded body, and a metal porous body was thus obtained (the second step).

<Bath Composition>

Salt (aqueous solution): Nickel sulfamate (400 g/L as the amount of Ni)

Boric acid: 35 g/L pH: 4.5.

<Conditions for Electrolysis>

Temperature: 50° C.

Current density: 5 A/dm$^2$

Anode: Insoluble anode.

<Fabrication of Surface-coated Metal Porous Body>

(Third Step)

The metal porous body obtained in the second step (size: 20 mm×100 mm) was immersed in a mixed solution with a composition shown in Table 1. Note, however, that the third step was not performed for sample 5. Details of components described in Table 1 were as follows.

Graphite (distance D=about 5 μm, aspect ratio=20 to 50),

Carbon black (average grain diameter=40 nm),

Styrene butadiene rubber

Xylene

TABLE 1

| Sample | Metal of Framework Body | Composition of Mixed Solution for Forming Coating Film | | | | | | | |
|---|---|---|---|---|---|---|---|---|---|
| | | Scale-like Carbon Material (% by mass) | | Fine-grained Conductive Material (% by mass) | | Binder (% by mass) | | Solvent (% by mass) | |
| 1 | Ni | Graphite | 10 | Carbon Black | 5 | Styrene Butadiene Rubber | 5 | Xylene | 80 |
| 2 | Ni | Graphite | 10 | Carbon Black | 5 | Styrene Butadiene Rubber | 5 | Xylene | 80 |
| 3 | Ni | Graphite | 10 | Absent | 0 | Styrene Butadiene Rubber | 5 | Xylene | 85 |
| 4 | Ni | Absent | 0 | Carbon Black | 10 | Styrene Butadiene Rubber | 5 | Xylene | 85 |
| 5 | Ni | Absent | 0 | Absent | 0 | Absent | 0 | Absent | 0 |

<<Fabrication of Surface-coated Metal Porous Body>>
<Fabrication of Metal Porous Body>

A metal porous body was fabricated through the following procedure.

First, a 1.5 mm-thick polyurethane resin sheet was prepared as a resin molded body having a three-dimensional network structure. When this polyurethane resin sheet's porosity and average pore diameter were determined based on the above calculation expressions, the porosity was 96% and the average pore diameter was 450 μm.

Subsequently, the resin molded body was impregnated with a conductive paint (slurry containing carbon black), and then squeezed with a roll and dried to form a conductive coating layer on a surface of the resin molded body. A conductive resin molded body was thus obtained (the first step).

Using the conductive resin molded body as a cathode, electrolytic plating was performed with a bath composition under conditions for electrolysis, as indicated below. As a The metal porous body was pulled up from the mixed solution, and was subjected to air blow to remove clogging (for 10 seconds). Then, the metal porous body subjected to air blow was dried at 150° C. for five minutes. Thereby, a surface-coated metal porous body was obtained. It should be noted that, for sample 2, this step was repeatedly performed three times.

Through the above procedure, surface-coated metal porous bodies of samples 1 to 4 and a metal porous body of sample 5 were obtained. Herein, samples 1 and 2 correspond to examples, and samples 3 to 5 correspond to comparative examples.

<<Evaluation of Surface-coated Metal Porous Body>>
<Analysis of Framework>

For each of samples 1 to 5 obtained by the above method, a constituent element in the body of the framework thereof was examined with an EDX device accompanying the SEM (an SEM part: trade name "SUPRA35VP" manufactured by Carl Zeiss Microscopy Co., Ltd., and an EDX part: trade name "octane super" manufactured by AMETEK, Inc.). Specifically, first, the surface-coated metal porous body of each sample (the metal porous body in the case of sample 5; the same applies hereinafter) was cut. Subsequently, the cut surface-coated metal porous body had its framework observed in cross section with the EDX device to specify each detected element. As a result, the constituent element in the framework body of each of samples 1 to 5 matched the constituent element contained in the plating bath used to prepare the sample.

Further, the above calculation expressions were used to determine the average pore diameter and porosity of the framework of each of samples 1 to 5. As a result, the average pore diameter and porosity matched the resin molded body's porosity and average pore diameter, and the porosity was 96% and the average pore diameter was 450 μm. Further, in each of samples 1 to 5, the shape of an external appearance had a thickness of 1.4 mm. In each of samples 1 to 5, the apparent weight of the metal was 660 g/m², as has been set forth above.

(Analysis of Cross Section of Framework)

A sample of a cross section of each of the surface-coated metal porous bodies was observed with an electron microscope at a magnification of 3,000 times to determine the thickness of the framework body and the thickness of the framework. In doing so, 10 fields of view were observed, and the thickness of the framework body and the thickness of the framework were determined in each field of view. Finally, average values thereof were calculated to determine the thickness of the framework body and the thickness of the framework. Table 2 shows the result.

<Analysis of Coating Film>

(Mass of Coating Film)

A mass per unit area (g/m²) of the coating film was determined from a difference between a mass per unit area (g/m²) of a main surface in the external appearance of the metal porous body before the coating film was formed and a mass per unit area (g/m²) of a main surface in the external appearance of the surface-coated metal porous body after the coating film was formed. Table 2 shows the result.

(Analysis of Cross Section of Coating Film)

A sample of a cross section of each of the surface-coated metal porous bodies was observed with an electron microthe scale-like carbon material was also observed (for example, FIG. 8). Table 2 shows the result.

<Evaluation of Performance>

(Evaluation of Corrosion Resistance)

Corrosion resistance of each surface-coated metal porous body was evaluated under the following conditions in conformity with ASTM G5-94. Table 2 shows the result. As the surface-coated metal porous body has a smaller current value, the surface-coated metal porous body can be evaluated to be more excellent in corrosion resistance. In the present evaluation, when the current value was less than 0.1 mA/cm², the surface-coated metal porous body was determined to have an excellent corrosion resistance.

Conditions for Measurement

Aqueous solution: 1M $Na_2SO_4+H_2SO_4$ (pH 3)

Temperature for measurement: 60° C.

5 mV/s, 0.8V vs Standard hydrogen electrode (SHE)

(Evaluation of Electric Resistance)

Two copper plates (length: 15 cm, width: 1 cm) were placed on an insulating stand to be parallel to each other with a spacing of 5 cm therebetween. Then, each surface-coated metal porous body cut to have a width of 10 mm was placed on the two copper plates to come into contact therewith. In doing so, the surface-coated metal porous body was placed such that the longitudinal direction of the surface-coated metal porous body was orthogonal to the longitudinal direction of the copper plates. The placed surface-coated metal porous body was pressed down with a weight (load: 0.25 kg/cm²) from above, and then an electric resistance between the two copper plates was evaluated with a multi-tester, using a four-terminal method. The electric resistance value obtained on this occasion corresponds to the electric resistance value of the surface-coated metal porous body. Table 2 shows the result.

(Evaluation of Water Repellency)

A water droplet was dropped on each surface-coated metal porous body to observe the time taken until the water droplet penetrated the surface-coated metal porous body, as well as the shape of the water droplet. When the water droplet did not penetrate the surface-coated metal porous body for three or more minutes and the contact angle was about 120° or more, the surface-coated metal porous body was evaluated to have water repellency. Table 2 shows the result.

TABLE 2

| | Framework | | | Coating Film | | | Evaluation | | |
|---|---|---|---|---|---|---|---|---|---|
| Sample | Thickness of Framework Body (μm) | Thickness of Framework (μm) | Mass per Unit Area (g/m²) | Deposited State of Scale-like Carbon Material | Thickness (μm) | Corrosion Resistance at 0.8 V (mA/cm²) | Electric Resistance (Ω) | Water Repellency | |
| 1 | 23 | 75.2 | 51 | Parallel* | 3.2 | 0.09 | 41 | Exhibited | |
| 2 | 21 | 80.3 | 185 | Parallel | 13 | 0.04 | 65 | Exhibited | |
| 3 | 24 | 69.7 | 49 | Parallel | 3.4 | 1.1 | 39 | Exhibited | |
| 4 | 20 | 72.9 | 54 | Porous** | 2.5 | 0.008 | 562 | Exhibited | |
| 5 | 21 | 71.4 | 0 | not available | not available | 0.5 | 36 | Exhibited | |

*means parallel to the surface of the framework.
**means that the coating film is porous because it does not include the scale-like carbon material.

scope at a magnification of 3,000 times to determine the thickness of the coating film. In doing so, 10 fields of view were observed, and the thickness of the coating film was determined in each field of view. Finally, an average value thereof was calculated to determine the thickness of the coating film. Further, on this occasion, the deposited state of <Consideration>

Table 2 shows that the metal porous body of sample 5, in which no coating film was formed, had a current value of 0.5 mA/cm² at 0.8 V in the evaluation of corrosion resistance. In contrast, the surface-coated metal porous bodies of samples 1 and 2, in which the coating film was formed, had current values of 0.09 mA/cm² and 0.04 mA/cm², respectively, at 0.8 V in the evaluation of corrosion resistance. These current values are substantially equal to a current value obtained when measurement is performed on a titanium metal, which is known for its excellence in corrosion resistance (current value at 0.8 V: 0.075 mA/cm$^2$). The above results show that the surface-coated metal porous bodies of samples 1 and 2 were more excellent in corrosion resistance, when compared with the metal porous body of sample 5.

Although the embodiments and examples of the present invention have been described as described above, it has also been planned from the beginning to appropriately combine the configurations of the above-described embodiments and examples.

The embodiments and examples disclosed herein are illustrative in any respects and should not be construed as being restrictive. The scope of the present invention is defined by the terms of the claims, rather than the above-described embodiments and examples, and is intended to include any modifications within the scope and meaning equivalent to the claims.

REFERENCE SIGNS LIST

1: rib; 2: node; 10: frame; 11: framework body; 12: framework; 13: inner portion; 14: pore; 15: coating film; 20: cell; 30: three-dimensional network structure; A: virtual plane.

The invention claimed is:

1. A surface-coated metal porous body having a three-dimensional network structure, the surface-coated metal porous body comprising:

a framework forming the three-dimensional network structure; and a coating film provided on a surface of the framework, wherein the framework has a body including a metal element as a constituent element, the coating film includes a scale-like carbon material and a fine-grained conductive material, a distance D between two points that are farthest from each other on an outer perimeter of a main surface of the scale-like carbon material is 5% or more and 120% or less relative to a thickness of the framework, and the scale-like carbon material is deposited parallel to the surface of the framework.

2. The surface-coated metal porous body according to claim 1, wherein the coating film has a thickness of 0.2 μm or more and 100% or less of a thickness of the body of the framework.

3. The surface-coated metal porous body according to claim 1, wherein the scale-like carbon material includes graphite.

4. The surface-coated metal porous body according to claim 1, wherein the scale-like carbon material has an aspect ratio of 5 or more and 100 or less.

5. The surface-coated metal porous body according to claim 1, wherein the fine-grained conductive material includes at least one selected from the group consisting of carbon black, titanium, spheroidal graphite, and stainless steel.

6. The surface-coated metal porous body according to claim 1, wherein the metal element in the body of the framework includes at least one selected from the group consisting of nickel, aluminum, copper, chromium, and tin.

7. The surface-coated metal porous body according to claim 1, wherein, when the body of the framework is observed in cross section at a magnification of 3,000 times to obtain an observed image, the observed image presents in any area 10 μm square thereof five or less voids each having a major axis of 1 μm or more.

8. The surface-coated metal porous body according to claim 1, wherein the framework is hollow.

* * * * *